United States Patent
Parker et al.

(10) Patent No.: US 6,224,216 B1
(45) Date of Patent: May 1, 2001

(54) SYSTEM AND METHOD EMPLOYING LED LIGHT SOURCES FOR A PROJECTION DISPLAY

(75) Inventors: Fred Parker, Sherwood; Mark Peterson, Lake Oswego, both of OR (US)

(73) Assignee: Infocus Corporation, Wilsonville, OR (US)

( * ) Notice: Subject to any disclaimer, the term of this patent is extended or adjusted under 35 U.S.C. 154(b) by 0 days.

(21) Appl. No.: 09/507,260

(22) Filed: Feb. 18, 2000

(51) Int. Cl.$^7$ .................................................. B03B 21/14
(52) U.S. Cl. .................. 353/31; 353/94; 345/46; 345/83; 348/742
(58) Field of Search .................. 353/31, 34, 37, 353/94; 349/7, 8, 62, 68; 345/46, 82, 83; 348/742, 771, 801, 804

(56) References Cited

U.S. PATENT DOCUMENTS

| | | | |
|---|---|---|---|
| 3,962,702 | 6/1976 | Kriege | 340/380 |
| 4,680,579 | 7/1987 | Ott | 340/783 |
| 4,763,975 | 8/1988 | Scifres et al. | 350/96.15 |
| 4,943,154 | 7/1990 | Miyatake et al. | 353/31 |
| 5,022,043 | 6/1991 | Jacobs | 372/95 |
| 5,053,765 | * 10/1991 | Sonehara et al. | |
| 5,108,172 | * 4/1992 | Flasck | 353/31 |
| 5,359,345 | * 10/1994 | Hunter | 345/48 |
| 5,426,474 | * 6/1995 | Rubstov et al. | 353/84 |
| 5,430,501 | 7/1995 | Nakamura | 348/744 |
| 5,513,023 | * 4/1996 | Fritz et al. | 359/40 |
| 5,651,599 | 7/1997 | Fujimori et al. | 353/61 |
| 5,724,062 | * 3/1998 | Hunter | 345/46 |
| 5,808,800 | 9/1998 | Handschy et al. | 359/630 |
| 5,897,190 | 4/1999 | Takahashi | 353/31 |
| 5,920,297 | 7/1999 | Alexander | 345/83 |

* cited by examiner

*Primary Examiner*—William Dowling
(74) *Attorney, Agent, or Firm*—Stoel Rives LLP (57) ABSTRACT

In a single path embodiment of a multimedia projector (30) of the present invention, the light emitted from blue, green, and red generally monochromatic LEDs (72) or LED arrays (70) is propagated through optical fibers (76) and then integrated through an optical integrator (40). A display controller (56) receives image data from a personal computer (58) and converts the data to color frame sequential data delivered to a common display device (44). The display controller (56) synchronizes the data with ON/OFF signals conveyed to an LED power supply (34). Because the synchronization is entirely electronic, the frame sequential information can be cycled much faster and more accurately than can be accomplished with a color wheel system (10). In a multiple path embodiment of a multimedia projector (120) of the present invention, the light emitted from blue, green, and red generally monochromatic LEDs (72) or LED arrays (70) is propagated along separate respective optical paths (36*b*, 36*g*, 36*r*) through optical fibers (76) and then integrated through an optical integrator (40). A display controller (56) receives image data from a personal computer (58) and converts the data to color frame sequential data delivered to respective separate display devices (44*b*, 44*g*, 44*r*) whose output is coupled into a combiner (122). The display controller (56) synchronizes the data between the separate display devices (44*b*, 44*g*, 44*r*) to form a composite image. In this embodiment, all three sets of LEDs (72) can be left ON continuously. Other LED array color combinations can be employed with or without an additional white light path.

24 Claims, 5 Drawing Sheets

SYSTEM AND METHOD EMPLOYING LED LIGHT SOURCES FOR A PROJECTION DISPLAY

TECHNICAL FIELD

This invention relates to image projection displays and more particularly to an LED light source employed in an optical pathway of such displays.

BACKGROUND OF THE INVENTION

Projection systems have been used for many years to project motion pictures and still photographs onto screens for viewing. More recently, presentations using multimedia projection systems have become popular for conducting sales demonstrations, business meetings, and classroom instruction.

In a common operating mode, multimedia projection systems receive analog video signals from a personal computer ("PC"). The video signals may represent still, partial-, or full-motion display images of a type rendered by the PC. The analog video signals are typically converted in the projection system into digital video signals, and the signals are electronically conditioned and processed to control an image-forming device, such as a liquid crystal display ("LCD") or a digital micromirror device ("DMD").

A popular type of multimedia projection system employs a broad spectrum light source and optical path components upstream and downstream of the image-forming device to project the image onto a display screen. An example of a DMD-base multimedia projector is the model LP420 manufactured by In Focus Systems, Inc., of Wilsonville, Ore., the assignee of this application.

Significant effort has been invested into developing projectors producing bright, high-quality, color images. However, the optical performance of conventional projectors is often less than satisfactory. For example, suitable projected image brightness is difficult to achieve, especially when using compact portable color projectors in a well-lighted room. The projectors typically use high intensity arc lamps as their light source and then filter out all of the light except for blue, green, and red light and employ three separate light paths or some forms of sequential color modulator to coordinate color image data.

Because LCD displays have significant light attenuation and triple path color light paths are heavy and bulky, portable multimedia projectors typically employ DMD displays in a single light path configuration. Producing a projected color image with this configuration typically requires projecting a frame sequential image through a sequential color modulator, such as a color wheel.

Figure 1:
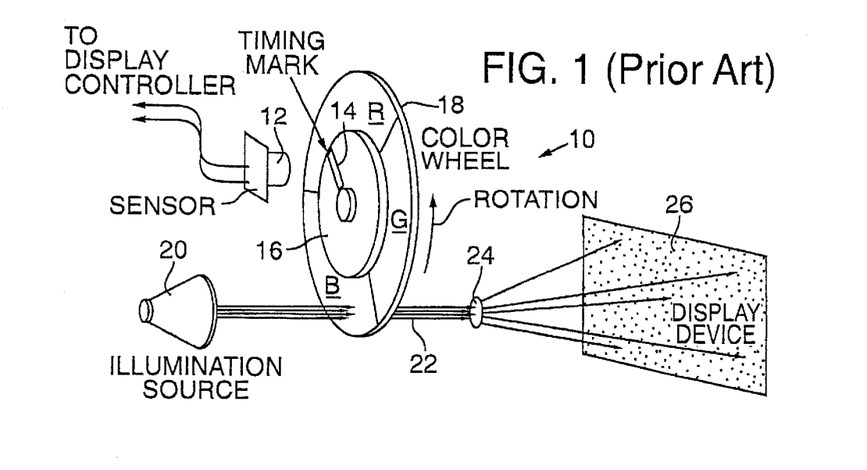
FIG. 1 is a simplified pictorial diagram showing the operating principle of a prior art FSC display device employing a color wheel having an optoelectrically sensed timing mark.

FIG. 1 shows a typical prior art frame sequential color (FSC) display system 10 in which a sensor 12 senses a timing mark 14 to detect a predetermined color index position of a motor 16 that rotates a color wheel 18 having respective red, green, and blue filter segments R, G, and B. A light source 20 projects a light beam 22 through color wheel 18 and a relay lens 24 onto a display device 26, such as an LCD-based light valve or a DMD. A display controller (not shown) drives display device 26 with sequential red, green, and blue image data that are timed to coincide with the propagation of light beam 22 through the respective filter segments R, G, and B of color wheel 18. A DC motor rotates color wheel 18 at about 6,650 rpm to about 7,500 rpm. Clearly, successful operation of a FSC display system depends on properly synchronizing the red, green, and blue image data to the angular position of color wheel 18.

Sensor 12 typically employs any of optoelectrical or electromechanical shaft position or motor armature position detectors and usually requires some means for aligning timing mark 14 to the start of one of the filter segments. This alignment is typically a costly and error prone mechanical adjustment that accounts for angular differences between motor 16 and the mechanical mounting of filter segments R, G, and B. Of course, electrical or mechanical delays associated with sensor 12 further contribute to alignment errors.

The accumulated angular errors open the possibility of synchronization errors between the red, green, and blue image data to the angular position of color wheel 18, a possibility that prior workers avoided by building a timing duty cycle into the display controller electronics. The timing duty cycle provides for driving display device 26 with the red, green, and blue image data for only a portion of the time when light beam 22 is propagating through each of respective filter segments R, G, and B to prevent presenting display device 26 with an improper color. Unfortunately, the timing duty cycle reduces the total amount of illumination available for displaying each color and, therefore, reduces the brightness of the resultant displayed color image. In addition, color wheels 18 and their associated motors are heavy and noisy.

An alternative technique that substantially eliminates any mechanical, optical, and electrical rotational timing errors that are intrinsic to color wheel systems is, therefore, desired.

SUMMARY OF THE INVENTION

An object of this invention is, therefore, to provide an apparatus and a method for employing an LED light source in a projection display system.

The present invention employs light sources such as LEDs or diode lasers that emit desired wavelengths such as the primary colors rather than starting with a broadband light source and filtering out the undesired wavelengths. The invention eliminates the need for color wheels, color wheel motors, or beam splitters.

In addition, LEDs offer a longer life, fewer thermal issues than HID lamps, better primary colors, redundancy for failed pixels, electronic (faster) sequencing of the colors for better color depth, and dynamic adjustment of the color temperature by directly controlling the amount of blue, green, and red light generated.

One design constraint involves positioning the individual LEDs sufficiently close together to efficiently illuminate the small imaging devices currently used, particularly without creating thermal problems for the LEDs, certain imaging devices, or other sensitive system components. One solution includes mounting bare LED dies together on a thermally conductive substrate, such as alumina, for better heat conduction and employing optical fibers to transmit the light efficiently to the imaging device. Each LED, LED die, or LED array can be coupled to separate optical fibers, which could have ends shaped to a lens surface similar to a 'fly's eye' array, and the fibers can then be bundled together into a small group, such that surface area of the array of LEDs can be much larger than that of the imaging device for thermal management, yet appear to be effectively smaller. The bundle of optical fibers can then be coupled to an integrating light pipe to effectively blend the light and uniformly illuminate the imaging device. LED-lighted display projectors of this type would provide a lighter weight, simpler, brighter, and less expensive multimedia projection system.

In a single path embodiment of the present invention, the light emitted from blue, green, and red generally monochromatic LEDs or LED arrays is propagated through optical fibers and then mixed within an optical integrator. A display controller receives image data from an image data source such as a personal computer and converts the data to color frame sequential data delivered to a common display device. The controller synchronizes the data with ON/OFF signals conveyed to the LED power supply. Because the synchronization is entirely electronic, the frame sequential information can be cycled much faster and more accurately than can be accomplished with a color wheel system.

In a triple path embodiment of the present invention, the light emitted from blue, green, and red generally monochromatic LEDs or LED arrays is propagated along separate respective optical paths through optical fibers and then preferably made substantially spatially uniform through an optical integrator. A display controller receives image data from an image data source such as a personal computer and converts the data to color data delivered to respective separate display devices whose output is coupled into a combiner. The display controller synchronizes the data between the separate display devices to form a composite image. In this embodiment, all three sets of LEDs can be left ON continuously.

Additional objects and advantages of this invention will be apparent from the following detailed description of a preferred embodiment thereof that proceeds with reference to the accompanying drawings.

DETAILED DESCRIPTION OF A PREFERRED EMBODIMENT

Figure 2:
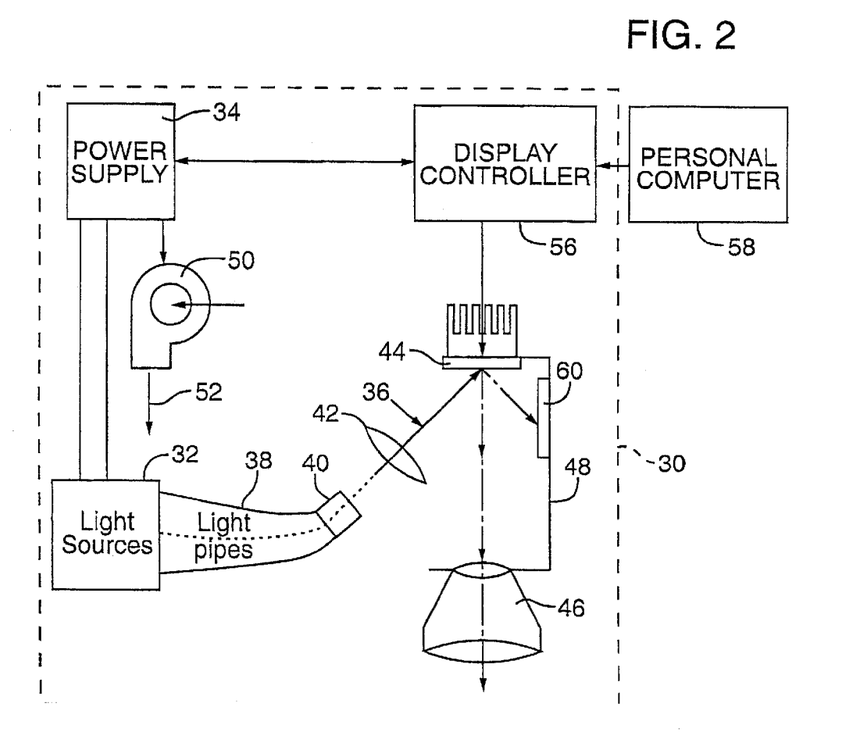
FIG. 2 is a simplified pictorial and electrical block diagram of a multimedia projector showing a light path employing an LED light source in accordance with an embodiment of the present invention.

FIG. 2 shows a generic "single path" embodiment of a multimedia projector 30 of the present invention that employs multiple, relatively monochromatic light sources 32 of two or more different wavelengths. Light sources 32 are preferably LEDs or LED arrays and are powered by a power supply 34.

Light emitted from light sources 32 generally propagates along separate and common portions of an optical path 36 that may include light transmission guides 38, an optical integrator 40, one or more optical path lenses 42, a display device 44, a projection lens group 46 and various other optical components known to skilled persons.

Display device 44 is preferably a DMD but may alternatively be a reflective liquid crystal on semiconductor ("LCOS") array device or an LCD light valve. Projection lens group 46 preferably includes a fixed focal length lens but may also include a varifocal or zoom lens.

The optical components are preferably held together by a magnesium die-cast optical frame 48 (only a portion of which is shown) within a projector housing (not shown) which are mechanically rigid and dissipate heat. Such frames and housings are well known to skilled persons and can be adapted to house a cooling fan 50 for cooling the optical components and facilitate cooling air flow 52. Power supply 34 can also be used to power cooling fan 50 and display controller 56.

Display controller 56 that includes a microprocessor receives color image data from a multimedia device 58, such as a personal computer or a video device, and processes the image data into frame sequential red, green, and blue image data, sequential frames of which are conveyed to display device 44 in proper synchronism with signals sent to power supply 34 to turn on the light sources 32 that emit the corresponding color.

Where display device 44 is a DMD, display controller 56 controls a high-density array of digitally deflected mirrors in display device 44 such that light propagating from lens 42 is selectively reflected by each mirror in the array either toward projection lens 46 or toward a light-absorbing surface 60 mounted on or near optical frame 48. The light reflecting off mirrors of display device 44 oriented in the ON direction propagates through projection lens 46 for display on a screen (not shown), and the light reflecting off mirrors of display device 44 oriented in the OFF direction is absorbed by light-absorbing surface 60.

DMD 44 is preferably a Texas Instruments Model DMD 1076 spatial light modulator composed of a rectangular array of aluminum micro mechanical mirrors, each of which can be individually deflected at an angle of, for example, ±10 degrees or more about a hinged diagonal axis. The deflection angle (either positive or negative) of the mirrors is individually controlled by changing the memory contents of underlying addressing circuitry and mirror reset signals.

If display device 44 is, for example, a transmissive liquid crystal display (LCD), the optical path 36 could propagate through it and straight through projection lens 46 without any bends. Where display device 44 is a transmissive LCD 44, the light from light transmission guides 38 is first polarized by a polarizer that may form part of LCD 44 to create light having a selected pass orientation. The polarized light is then modulated by an informational pattern of pixels in LCD 44. The fully inactive pixels rotate the polarized light by 90°, and the fully active pixels pass the polarized light without rotation. The modulated light then passes through a front polarizer (or analyzer) that blocks the rotated light of the fully activated pixels and passes the nonrotated light of the fully inactive pixels. The modulated light, particularly the light passing through the inactive pixels, is directed through projection lens 46 for viewing.

Skilled persons will appreciate that a variety of LCD panels are commercially available and some employ different polarization schemes that could be employed in the present invention. For FIG. 2, LCDs 44 would be reflective LCDs and for FIG. 9 LCDs 44 would be transmissive LCDs such as XGA-resolution LCDs manufactured by Sony Electronic, Inc., under model number LCX017AL.

Figure 3:
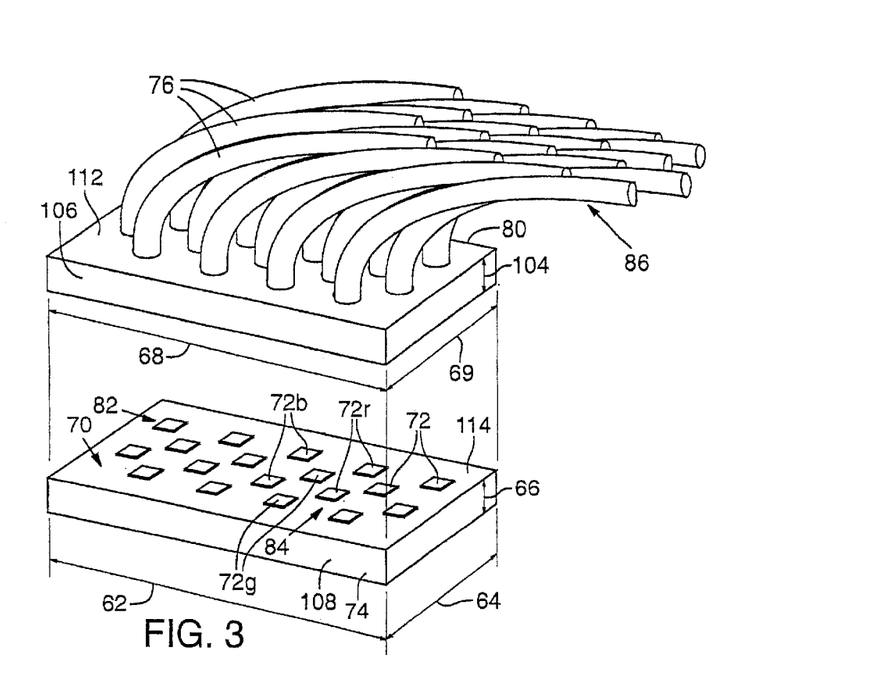
FIG. 3 is a partly exploded orthographic projection of an LED array light source optically connected to optical fibers through a cover plate in accordance with an embodiment of the invention.

FIG. 3 presents an embodiment in which light sources 32 comprise multiple LED arrays 70 of multiple LEDs 72 on a substrate 74 and light transmission guides 38 include optical fibers 76. With reference to FIG. 3, ends of optical fibers 76 extend through, and are held in place by, holes 78 in a cover plate 80 and are mated to LEDs 72 in a one-to-one relationship. In this embodiment, the LEDs 72 and holes 78 are aligned in rows 82 and columns 84.

In one embodiment, LED array 70 has a length 62 of about 16 mm, a width 64 of about 12 mm, and a height 66 of about 1 mm. In this same embodiment, cover plate 80 has a length 68 of 20 mm, a width 69 of about 17 mm, and a height 104 of about 10 mm. Cover plate 80 is preferably constructed of aluminum, magnesium, and/or other heat-dissipating materials. Cover plate 80 can also be adapted to provide space between its walls 106 and sides 108 of LED array 70, as well as between top 112 of cover plate 80 and surface 114 of substrate 74 to facilitate air flow for cooling LED array 70.

In one embodiment, optical fibers 76 preferably comprise long and thin polymethyl-methacrylate waveguides of about 0.75–1.5 mm diameter that have a fluorinated polymer cladding and exhibit losses of less than about 0.17 dB/m.

In one embodiment, light sources 32 include multiple LED arrays 70 that are supplied with about 200 W and each emit at one of the three additive primary wavelengths: blue, green, and red at an efficiency of about 30%–50%. For example, the blue LEDs 72 can be HPWL series, manufactured by Hewlett Packard (HP), that emit 4.1 lumens per Watt in a wavelength range of 455–485 nm. Similarly, the green LEDs 72 can be HPWL series, also manufactured by HP, that emit 11.6 lumens per Watt in a wavelength range of 515–545 nm; and the red LEDs 72 can be HPWL series, also manufactured by HP, that emit 11 lumens per Watt in a wavelength range of 610–650 nm. Skilled persons will appreciate that as better LEDs with increased efficiency are developed and perfected, brighter LEDs would be preferred. LEDs 72 can be spaced apart as desired to facilitate dissipation of heat. Skilled persons will also appreciate that LED array 70 may comprise a side emitting bar of laser diodes.

Other LED emission wavelengths, such as yellow, cyan, or white can be additionally or alternatively employed. Although magenta LEDs do not currently exist, magenta can be made from a combination of red and blue LEDs 72. For convenience, white can be considered to be a single color or a combination of colors.

In one embodiment, LED array 70 is attached to 18 optical fibers 76 that are collected into one or more optical bundles 86 that may have a cumulative output area of less than 56 mm$^2$. Thus, LED array 70 has a greater area of substrate surface 114 that the output area of its respective optical fiber bundle 86 so the light exiting the bundle output area has greater intensity (and less heat) than the light emitted from surface 114 of the LED array 70.

Figure 4:
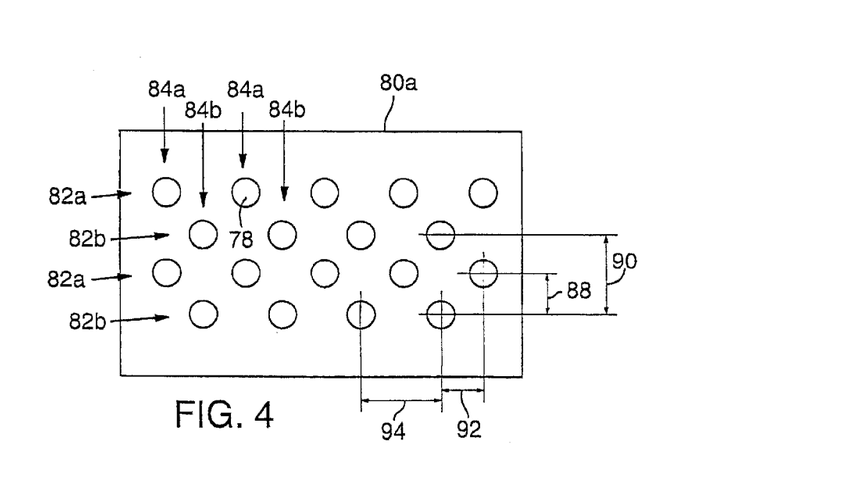
FIG. 4 is a plan view of an alternative embodiment of the LED array cover plate shown in FIG. 3.

FIG. 4 shows an alternative embodiment of cover plate 80a having offset rows 82a and 82b and columns 84a and 84b of holes 78. With reference to a preferred embodiment presented in FIG. 4, the center to center distance 88 between rows 82a and 82b is 2.8 mm; the center to center distance 90 between consecutive rows 82a and 82a or consecutive rows 82b and 82b is 5.6 mm; the center to center distance 92 between columns 84a and 84b is 1.5 mm; and the center to center distance 94 between consecutive columns 84a and 84a or consecutive columns 84b and 84b is 3.0 mm. Skilled person will appreciate, however, that many configurations of LED arrays 70 and respective cover plates 80 are possible and that LED arrays 70 can have different configurations for the same or different emission wavelengths. For example, blue or green LED arrays 70b and 70g may have respective LEDs 72b and 72g packaged closer together than red LEDs 72r are packaged in red LED arrays 70r. Skilled persons will also appreciate that a single LED array 70 can contain LEDs that all emit the same wavelength or can have rows 82, columns 84, or groupings of different wavelength LEDs 72b, 72g, and/or 72r as demonstrated in FIG. 3. Skilled persons will further appreciate that emission intensity, heat dissipation characteristics, and manufacturing cost may also play a role in determining the spacing and size of LEDs 72 and/or the size and number of LED arrays 70 that are employed.

Figure 5A:
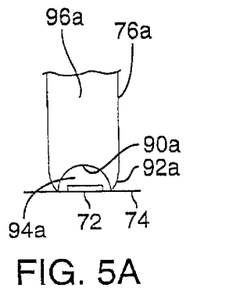
FIGS. 5A and 5B are side elevation views of alternative embodiments for optically connecting a single optical fiber to an individual flat LED.
Figure 5B:
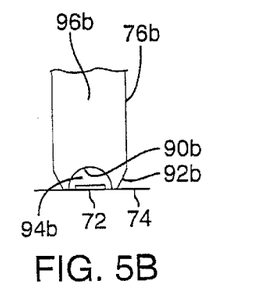

FIGS. 5A and 5B show embodiments for optically connecting a single optical fiber 76 to an individual flat surface LED 72. With reference to FIGS. 5A and 5B, optical fibers 76a or 76b can be employed without or in addition to cover plate 80. Optical fiber 76a has a concave parabolic end surface 90a and parabolic curvature toward the end of side wall 92a while optical fiber 76b has a convace spherical end surface 90b and a relatively flat angular end of side wall 92a. In either embodiment, the shape and/or coating of end surfaces 90a or 90b (generically or collectively end surfaces 90) and of the ends of side walls 92a or 92b (generically or collectively side walls 92) may be modified or otherwise coated to facilitate reflection of the light emitted from an LED 72 into optical fiber 74 at a desirable propagation angle. Similarly, spaces 94a and 94b can be filled with an optical gel or adhesive that has a desirable refractive index. Skilled persons will appreciate that flat end surfaces 90 of optical fibers 76 may be directly butt-coupled to LEDs 72 with or without a desirable optical gel or adhesive. Skilled persons will also appreciate that an optical fiber 76 can be side-coupled to a row 82 or column 84 of LEDs 72. Skilled persons further appreciate that a larger optical fiber or light pipe can be adapted in manners similar to those described above to be coupled to an entire LED array 70 instead of a single LED 72.

Figure 6:
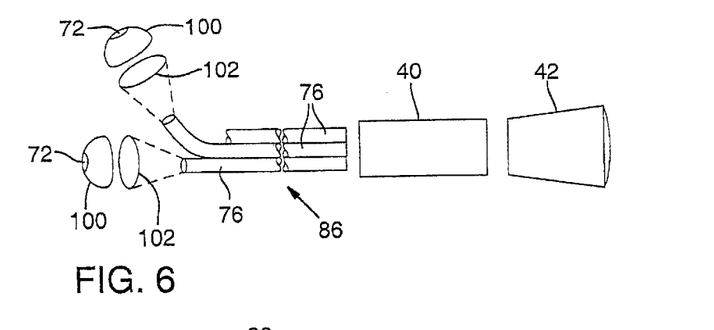
FIG. 6 is a side elevation view of an embodiment of an LED with a reflector optically coupled to a light pipe integrator through an optical fiber with a condenser lens.

FIG. 6 shows an embodiment employing a reflector 100 that directs light emitted by LED 72 (or LED array 70) into condenser lens 102 coupled to optical fiber 76, which is subsequently coupled to one or more optical integrators 40 or larger light pipes. Optical fibers 76 can be firmly bonded with a suitable optical adhesive to the input end of optical integrator 40 to reduce the vulnerability to breakage during assembly and servicing or can be spaced apart from optical integrator 40 or mounted to accommodate selective movement of different optical integrators 40. The optical integrator 40 serves to homogenize the light from a plurality of LEDs 72 or LED arrays 70. Optical integrator 40 can be of an elongated tunnel type and can be composed of a solid glass rod that relies on total internal reflection to transfer light through it and to create at its output end a uniform illumination field. Optical integrator 40 preferably includes squared off flat surfaces and can also include a cladding or reflective mirrored side walls that may protect internal reflection.

The input and output ends of optical integrator 40 can have different cross-sectional sizes and shapes to facilitate collection or concentration of light as desired. For example, the output end of optical integrator 40 may be shaped and/or angled to optimally image homogenized light onto an obliquely positioned imaging device 44. One such optical integrator 44 includes a rectangular input end and an asymmetrical light integrating tunnel that spatially integrates the light into a spatially uniform pattern that exits a nonrectangular output aperture of the tunnel. The uniform illumination exiting the nonrectangular output aperture can be re-imaged by a relay lens onto a reflective light valve that is mounted obliquely to the longitudinal axis of the tunnel. The image exiting the nonrectangular output aperture on the light valve can be intentionally distorted to compensate for any Keystone distortion, illumination overfill regions, and illumination drop-off regions, thereby preventing light loss, increasing brightness, and brightness uniformity across the light valve. Skilled persons will appreciate that numerous shape combinations for the input and output ends of optical integrator are possible.

Optical integrator 40 preferably has a three by four ratio cross section to provide a three by four display format compatible with SVGA and XGA resolutions. In one embodiment, optical integrator 40 has a preferred size of 16.3 mm by 21.7 mm. Optical integrator 40 may, however, include other formats such as a nine by sixteen ratio cross section (HDTV) or a five by four ratio cross section (SXGA). Moreover, multiple integrators of different cross sections and associated collection and projection optics can be arranged for selective movement into optical path 36 to provide distinct projection display formats as desired.

Figure 7:
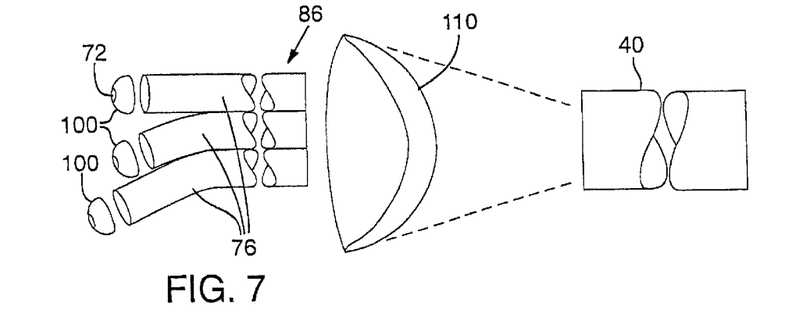
FIG. 7 is a side elevation view of an embodiment of an LED with a reflector optically coupled to a light pipe integrator with a condenser lens through an optical fiber.

FIG. 7 also shows an embodiment employing reflector 100 that directs light emitted by LED 72 (or LED array 70) into optical fiber 76. The light propagating through multiple optical fibers 76 is subsequently collected by a large condenser lens 110 which is coupled to optical integrator 40 or a larger light pipe.

With reference to FIGS. 2–7, in one embodiment, the output ends of approximately 200 or more fiber bundles 86 are coupled to the input end of optical integrator 40. If photometrically weighted intensity (white balanced at optimum luminance) of the blue, green, and red LED arrays 70 described above are desired, then approximately 45 blue LEDs 72, 105 green LEDs 72, and 50 red LEDs 72 would be employed to produce 2000 lumens of white light. Skilled persons will appreciate that white balancing can be accomplished or fine tuned by modulating the amount of time for which each different color LED array 70 is activated.

Figure 8:
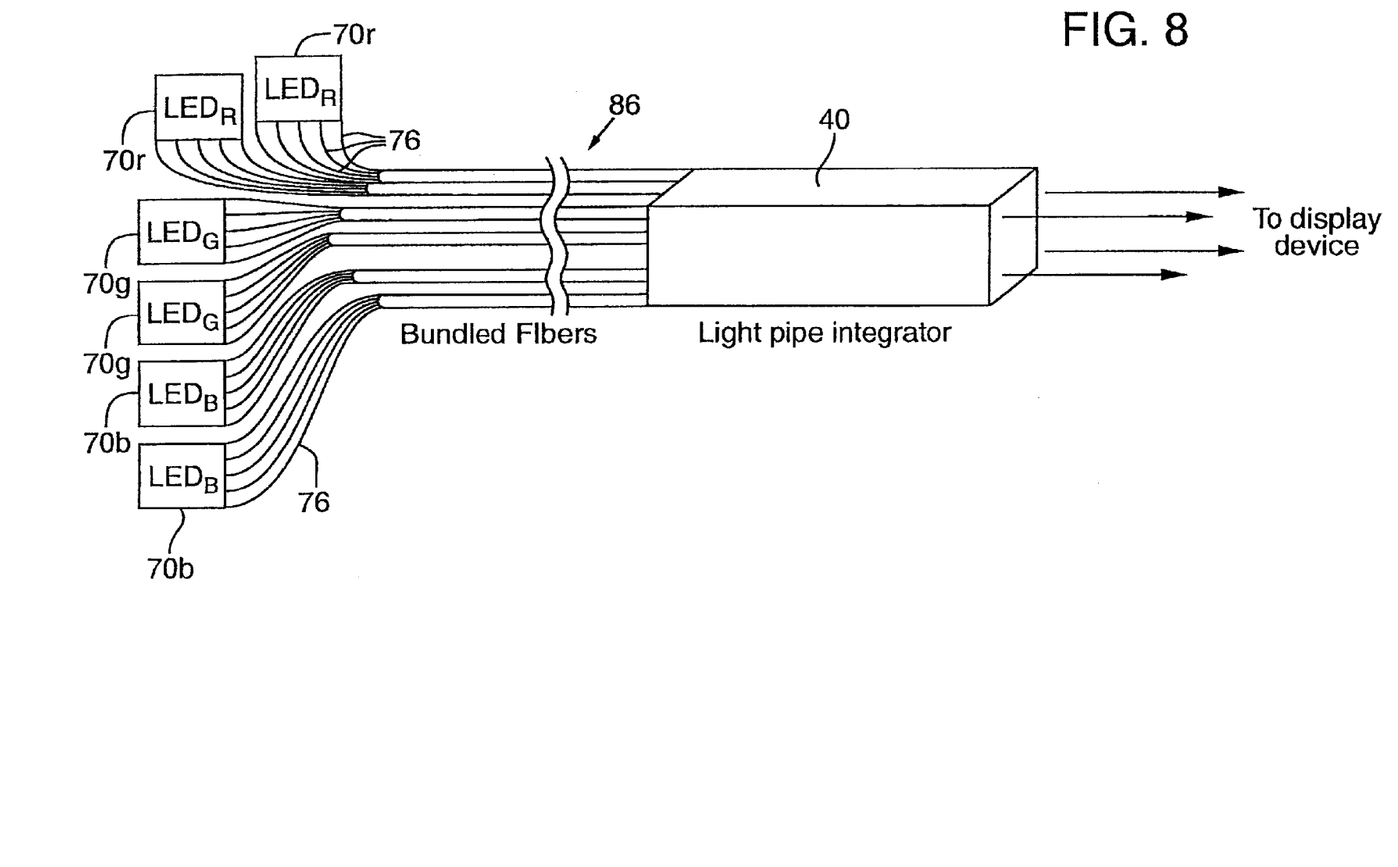
FIG. 8 is a partly schematic side elevation view of an embodiment employing multiple LED arrays of different emission wavelengths optically connected to a universal light pipe integrator through multiple respective fiber bundles.

FIG. 8 shows a detailed embodiment of a single path projector 30 employing single color LED arrays 70b, 70g, and 70r having respective blue, green, and red emission wavelengths. Optical fibers 76 from each similarly colored LED 72, LED array 70, or group of LED arrays 70 can be bundled into a common fiber bundle 86, which can be subsequently coupled into an optical integrator 40. Skilled persons will appreciate that the different groups of commonly colored fiber bundles 86 can be coupled into integrator 40 at the same or different angles. Skilled persons will also appreciate that each fiber bundle 86 can alternatively be adapted to contain one or multiple optical fibers 76 that collect from different colored LEDs 72. Such fiber bundles could be desirable to better homogenize the cumulative intensity of each wavelength of light at the entrance and exit of optical integrator 40. With reference again to FIG. 1 and FIG. 8, where different colored light is integrated into a common optical integrator prior to propagating to or through a display device 44 in a single path system, display controller 56 synchronizes turning ON and OFF the groups of similarly colored LEDs 72 with the color image data from personal computer 58 in a frame sequential manner. This LED-lighted single path projector 30 provides a light weight, simple, bright, and inexpensive multimedia projection system.

As discussed above with reference to FIG. 3, a variety of LED color options can be employed. In addition, white light from additional LED arrays or other white sources such as HID or arc lamps can be employed in a separate color time frame or selectively added to frames employing other colors. Alternatively or in addition, LED arrays 70b, 70g, and 70r can be employed simultaneously to create a white color time frame.

Figure 9:
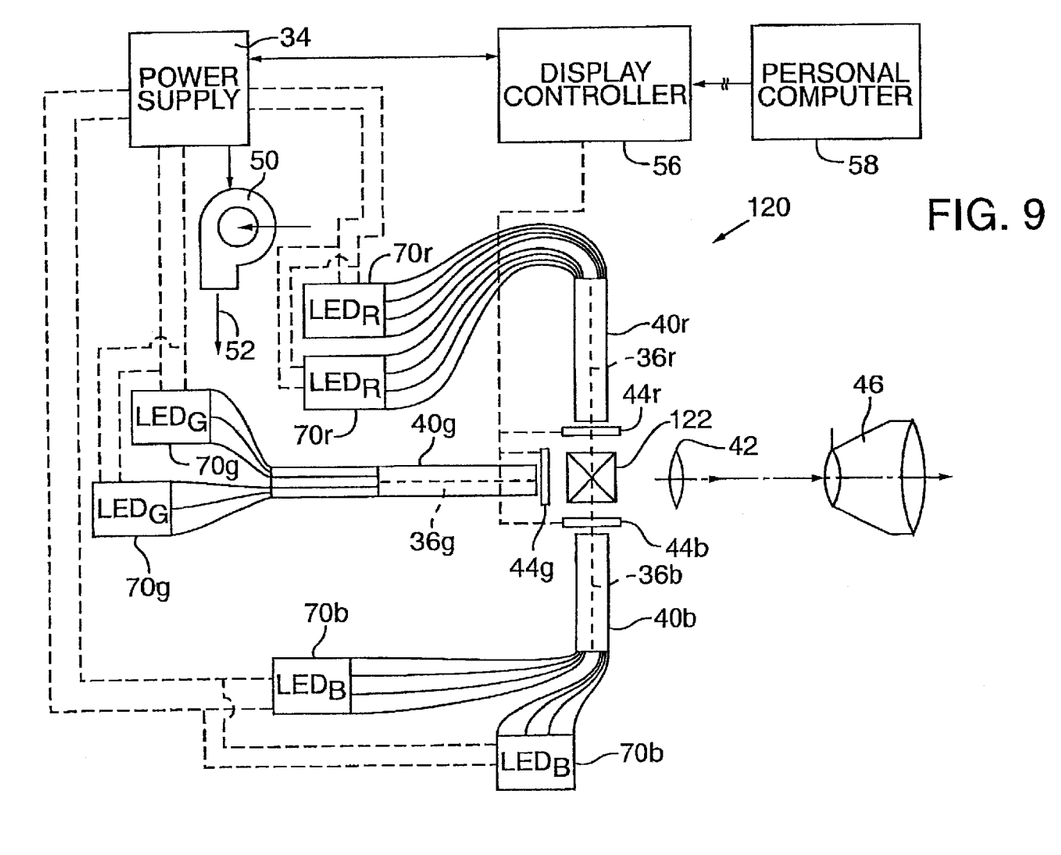
FIG. 9 is a partly schematic side elevation or plan view of an embodiment employing multiple LED arrays of different emission wavelengths optically connected to separate light pipe integrators through multiple respective fiber bundles.

FIG. 9 shows an embodiment of a triple path projector 120 employing single color LED arrays 70b, 70g, and 70r that emit light that propagates along separated respective optical paths 36b, 36g, and 36r, including propagating through respective fiber bundles 86b, 86g, and 86r to respective separate light pipe integrators 40 and through respective display devices 44b, 44g, and 44r, which are preferably LCDs. Optical paths 36b, 36g, and 36r meet at an optical combiner 122, which emits a composite image to lenses 42 and 46.

An advantage of this embodiment is that LED arrays 70b, 70g, and 70r can be left on continuously and do not require color frame synchronization. Instead, display controller 56 synchronizes instructions provided to display devices 44b, 44g, and 44r that are properly oriented with respect to each other and combiner 122 to generate the composite image. Such an image could be about 50% brighter than in a single path embodiment where each color is projected only ⅓ of the time for each image frame. Another advantage is that different types of LCDs could be employed to modulate the different color frames because some LCDs are more transmissive to some of the colors or provide better color output than other LCDs. Not having to limit selection to a single LCD that performs moderately well for all three colors would be very advantageous.

As discussed above, a variety of LED color options can be employed. In addition, white light from additional LED arrays or other white sources such as HID or arc lamps can be input, for example, into a fourth side of combiner 122 to enhance brightness and could be employed with or without a display device 44.

Skilled workers will recognize that portions of this invention may be implemented differently than the implementations described above for preferred embodiments. For example, skilled persons will appreciate that numerous variations of the LED 72, LED array 70, optical fiber 76, fiber bundle 86, reflector 100, condenser 102, and integrator 40 coupling schemes described herein can be employed with either the single path or triple path projection systems of the present invention. In addition, this invention is suitable for use with many differently folding optical paths, separate wavelength light sources, and alternative display devices, display controllers, and FSC data formats.

Skilled workers will further recognize that many changes may be made to the details of the above-described embodiment of this invention without departing from the underlying principles thereof. Accordingly, it will be appreciated that this invention is also applicable to color synchronization applications other than those found in multimedia projectors. The scope of the present invention should, therefore, be determined only by the following claims.

What is claimed is:

1. An image projection system for a display device, comprising:

a first set of first LEDs for generating first light having a first wavelength during a first emission time frame;

a second set of second LEDs for generating second light having a second wavelength during a second emission time frame, the second wavelength being different from the first wavelength;

a first set of first optical fibers, each first optical fiber including at opposite ends thereof a first input terminal for receiving first light from at least one of the first LEDs and a first output terminal to propagate the first light from directly or indirectly to an imaging device;

a second set of second optical fibers, each second optical fiber including at opposite ends thereof a second input terminal for receiving second light from at least one of the second LEDs and a second output terminal to propagate the second light directly or indirectly to the imaging device; and a display controller adapted to receive color image data from a data source and convert the color image data to at least first and second color frame sequential data for driving the imaging device, the display controller also being adapted to control the first and second emission time frames of the respective first and second sets of LEDs such that the imaging device implements the first color frame sequential data during the first emission time frame and the imaging device implements the second color frame sequential data during the second emission time frame.

2. The image projection system of claim 1, further comprising:

a third set of third LEDs for generating third light having a third wavelength, the third wavelength being different from the first and second wavelengths; and a third set of third optical fibers, each third optical fiber including at opposite ends thereof a third input terminal for receiving third light from at least one of the third LEDs and a third output terminal to propagate the third light directly or indirectly to the imaging device, the display controller being adapted to convert the color image data to first, second, and third color frame sequential data for driving the imaging device, the display controller also being adapted to control first, second, and third emission time frames of the respective first, second, and third sets of LEDs such that the imaging device implements the first, second, and third color frame sequential data during the respective first, second, and third emission time frames.

3. The image projection system of claim 2 in which the first, second, and third LEDs emit blue, green, and red light, respectively.

4. The image projection system of claim 1 in which the imaging device comprises a DMD, LCOS, or LCD.

5. The image projection system of claim 1 in which the data source comprises a personal computer.

6. A method for projecting color display information, comprising:

receiving color image data from a data source;

converting the color image data to at least first and second color frame sequential data for driving an imaging device;

generating first light at a first wavelength from a first set of first LEDs during a first emission time frame;

propagating the first light through a first set of first optical fibers, each first optical fiber including at opposite ends thereof a first input terminal for receiving first light from at least one of the first LEDs and a first output terminal to propagate the first light directly or indirectly to the imaging device;

implementing the first color frame sequential data during the first emission time frame at the imaging device to form a first color frame image;

generating second light at a second wavelength from a second set of second LEDs during a second emission time frame, the second wavelength being different from the first wavelength;

propagating the second light through a second set of second optical fibers, each second optical fiber including at opposite ends thereof a second input terminal for receiving second light from at least one of the second LEDs and a second output terminal to propagate the second light directly or indirectly to the imaging device; and implementing the second color frame sequential data during the second emission time frame at the imaging device to form a second color frame image.

7. The method of claim 6, further comprising:

converting the color image data to first, second, and third color frame sequential data for driving an imaging device;

generating third light at a third wavelength from a third set of third LEDs during a third emission time frame;

propagating the third light through a third set of third optical fibers, each third optical fiber including at opposite ends thereof a third input terminal for receiving third light from at least one of the third LEDs and a third output terminal to propagate the third light directly or indirectly to the imaging device; and implementing the third color frame sequential data during the third emission time frame at the imaging device to form a third color frame image.

8. The method of claim 7, further comprising:

emitting blue, green, and red light from the first, second, and third LEDs, respectively.

9. The method of claim 6 in which the imaging device comprises a DMD, LCOS, or LCD.

10. The method of claim 9 in which the imaging devices comprise different types of LCDs.

11. An image projection system for a color display device, comprising:

a first set of first LEDs for generating first light having a first wavelength;

a second set of second LEDs for generating second light having a second wavelength, the second wavelength being different from the first wavelength;

a first set of first optical fibers, each first optical fiber including at opposite ends thereof a first input terminal for receiving first light from at least one of the first LEDs and a first output terminal to propagate the first light directly or indirectly to a first imaging device;

a second set of second optical fibers, each second optical fiber including at opposite ends thereof a second input terminal for receiving second light from at least one of the second LEDs and a second output terminal to propagate the second light directly or indirectly to a second imaging device;

a display controller adapted to receive color image data from a data source and convert the color image data to at least first and second color data for driving the respective first and second imaging devices to project respective first and second images; and a combiner adapted for receiving simultaneously the first and second images from the respective first and second imaging devices and combining the first and second images to form a composite image.

12. The image projection system of claim 11, further comprising:

a third set of third LEDs for generating third light having a third wavelength, the third wavelength being different from the first and second wavelengths; and a third set of third optical fibers, each third optical fiber including at opposite ends thereof a third input terminal for receiving third light from at least one of the third LEDs and a third output terminal to propagate the third light directly or indirectly to a third imaging device, the display controller being adapted to convert the color image data to first, second, and third color data for driving the respective first, second, and third imaging devices to propagate respective first, second, and third images to the combiner, the combiner being adapted for receiving simultaneously the first, second, and third images and for forming a composite image.

13. The image projection system of claim 12 in which the first, second, and third LEDs emit blue, green, and red light, respectively.

14. The image projection system of claim 11 in which the imaging devices comprise LCDs.

15. The image projection system of claim 11 in which the data source comprises a personal computer.

16. A method for projecting color display information, comprising:

receiving color image data from a data source;

converting the color image data to at least first and second color data for driving respective first and second imaging devices;

generating first and second light of respective first and second different wavelengths from respective first and second sets of respective first and second LEDs;

propagating the first and second light through respective first and second sets of respective first and second optical fibers, each first optical fiber including at opposite ends thereof a first input terminal for receiving first light from at least one of the first LEDs and a first output terminal to propagate the first light directly or indirectly to a first imaging device and each second optical fiber including at opposite ends thereof a second input terminal for receiving second light from at least one of the second LEDs and a second output terminal to propagate the second light directly or indirectly to a second imaging device;

implementing the first and second color data at the respective first and second imaging devices to form respective first and second color images;

propagating the first and second color images to a combiner; and projecting a composite color image from the combiner.

17. The method of claim 16, further comprising:

converting the color image data to first, second, and third color data for driving an imaging device;

generating third light at a third wavelength from a third set of third LEDs;

propagating the third light through a third set of third optical fibers, each third optical fiber including at opposite ends thereof a third input terminal for receiving third light from at least one of the third LEDs and a third output terminal to propagate the third light directly or indirectly to a third imaging device;

implementing the third color data at the third imaging device to form a third color image;

propagating the first, second, and third color images to the combiner; and projecting a composite color image from the combiner.

18. The method of claim 17, further comprising:

emitting blue, green, and red light from the first, second, and third LEDs, respectively.

19. The method of claim 16 in which the imaging devices comprise LCDs.

20. The method of claim 19 in which the imaging devices comprise different types of LCDs.

21. The method of claim 8, further comprising:

generating first, second, and third light during a fourth emission time frame.

22. The image projection system of claim 1 in which the data source comprises a multimedia or video device.

23. The image projection system of claim 11, further comprising:

a white light source for generating white light; and an extra set of extra optical fibers, each extra optical fiber including at opposite ends thereof an extra input terminal for receiving white light from the white light source and an extra output terminal to propagate the white light directly or indirectly to the combiner.

24. The image projection system of claim 13, further comprising:

a white light source for generating white light; and an extra set of extra optical fibers, each extra optical fiber including at opposite ends thereof an extra input terminal for receiving white light from the white light source and an extra output terminal to propagate the white light directly or indirectly to the combiner.

* * * * *